(12) United States Patent
Pedde et al.

(10) Patent No.: US 7,559,100 B2
(45) Date of Patent: Jul. 14, 2009

(54) COVER ATTACHMENT DEVICE

(75) Inventors: Burkhard Pedde, Bruchköbel (DE);
Philippe Marenne, Rüsselsheim (DE);
Michael Hack, Bischofsheim (DE);
Georg Heinl, Zwingenberg (DE)

(73) Assignee: Woodbridge Foam Corporation (CA)

( * ) Notice: Subject to any disclaimer, the term of this patent is extended or adjusted under 35 U.S.C. 154(b) by 440 days.

(21) Appl. No.: 10/922,163

(22) Filed: Aug. 20, 2004

(65) Prior Publication Data
US 2005/0150090 A1   Jul. 14, 2005

Related U.S. Application Data

(60) Provisional application No. 60/496,390, filed on Aug. 20, 2003.

(51) Int. Cl.
*A47C 7/02* (2006.01)
*A47C 27/14* (2006.01)

(52) U.S. Cl. .................. 5/407; 297/218.2; 24/584.1; 24/DIG. 50; 24/DIG. 37; 24/DIG. 38

(58) Field of Classification Search .......... 5/407, 5/404, 403, 405, 653; 297/218.2, 218.3, 297/228.13, 218.5, 452.56; 24/460, 462, 24/584.1, DIG. 50, DIG. 37, DIG. 38
See application file for complete search history.

(56) References Cited

U.S. PATENT DOCUMENTS

| 4,470,179 | A | | 9/1984 | Gollin et al. |
| 4,508,220 | A | | 4/1985 | Pearson |
| 5,320,269 | A | | 6/1994 | Deschenes et al. |
| 5,388,749 | A | | 2/1995 | Davignon et al. |
| 5,442,838 | A | * | 8/1995 | Richardson et al. ........... 24/402 |
| 5,641,552 | A | | 6/1997 | Tillner |
| 5,683,025 | A | | 11/1997 | Grendol |
| 5,826,939 | A | * | 10/1998 | Beyer ...................... 297/218.3 |
| 5,896,720 | A | | 4/1999 | Bond |
| 6,047,450 | A | * | 4/2000 | Machacek et al. ............. 24/399 |
| 6,182,337 | B1 | * | 2/2001 | Machacek et al. ............. 24/400 |
| 6,478,209 | B1 | | 11/2002 | Bruins et al. |
| 6,568,761 | B2 | | 5/2003 | Perske et al. |
| 6,698,641 | B2 | | 3/2004 | Flannery et al. |
| 6,899,399 | B2 | * | 5/2005 | Ali et al. .................. 297/452.6 |
| 6,964,453 | B1 | | 11/2005 | Flegal et al. |

(Continued)

FOREIGN PATENT DOCUMENTS

CA   2165930 A1   6/1996

(Continued)

OTHER PUBLICATIONS

Feb. 24, 2003 Invitation To Pay Additional Fees, including annex, for International Application No. PCT/CA03/00246.

(Continued)

*Primary Examiner*—Alexander Grosz
(74) *Attorney, Agent, or Firm*—Katten Muchin Rosenman LLP

(57) ABSTRACT

There is described an attachment system for attaching a plurality of elements to a resilient body, preferably for attachment of a trim cover to a foam element. The system comprising a first element having attached thereto a first attachment portion and a second element having attached thereto a second attachment portion, the first attachment portion and the second attachment portion being releasably engageable with the resilient body.

83 Claims, 3 Drawing Sheets

U.S. PATENT DOCUMENTS

| | | | |
|---|---|---|---|
| 6,979,289 B2 * | 12/2005 | McMahon et al. | 493/213 |
| 2002/0101109 A1 | 8/2002 | Stiller et al. | |
| 2002/0121538 A1 | 9/2002 | Cooper et al. | |
| 2003/0215601 A1 | 11/2003 | Pedde et al. | |
| 2004/0205939 A1 | 10/2004 | Cooper et al. | |
| 2005/0006944 A1 | 1/2005 | Ali et al. | |

FOREIGN PATENT DOCUMENTS

| | | |
|---|---|---|
| DE | 44 46 450 C1 | 4/1996 |
| DE | 19530279 A1 | 12/1996 |
| DE | 298 21 697 U1 | 3/1999 |
| DE | 298 22 649 U1 | 4/1999 |
| DE | 299 17 372 U1 | 2/2000 |
| DE | 199 49 423 C1 | 1/2001 |
| JP | 07-67478 A | 3/1995 |
| WO | 98/18991 A1 | 5/1998 |
| WO | 02/36438 A1 | 5/2002 |
| WO | 2004/012909 A2 | 2/2004 |

OTHER PUBLICATIONS

English Translation of German patent document 29,822,649.
English Translation of German patent document 19,949,423.

* cited by examiner

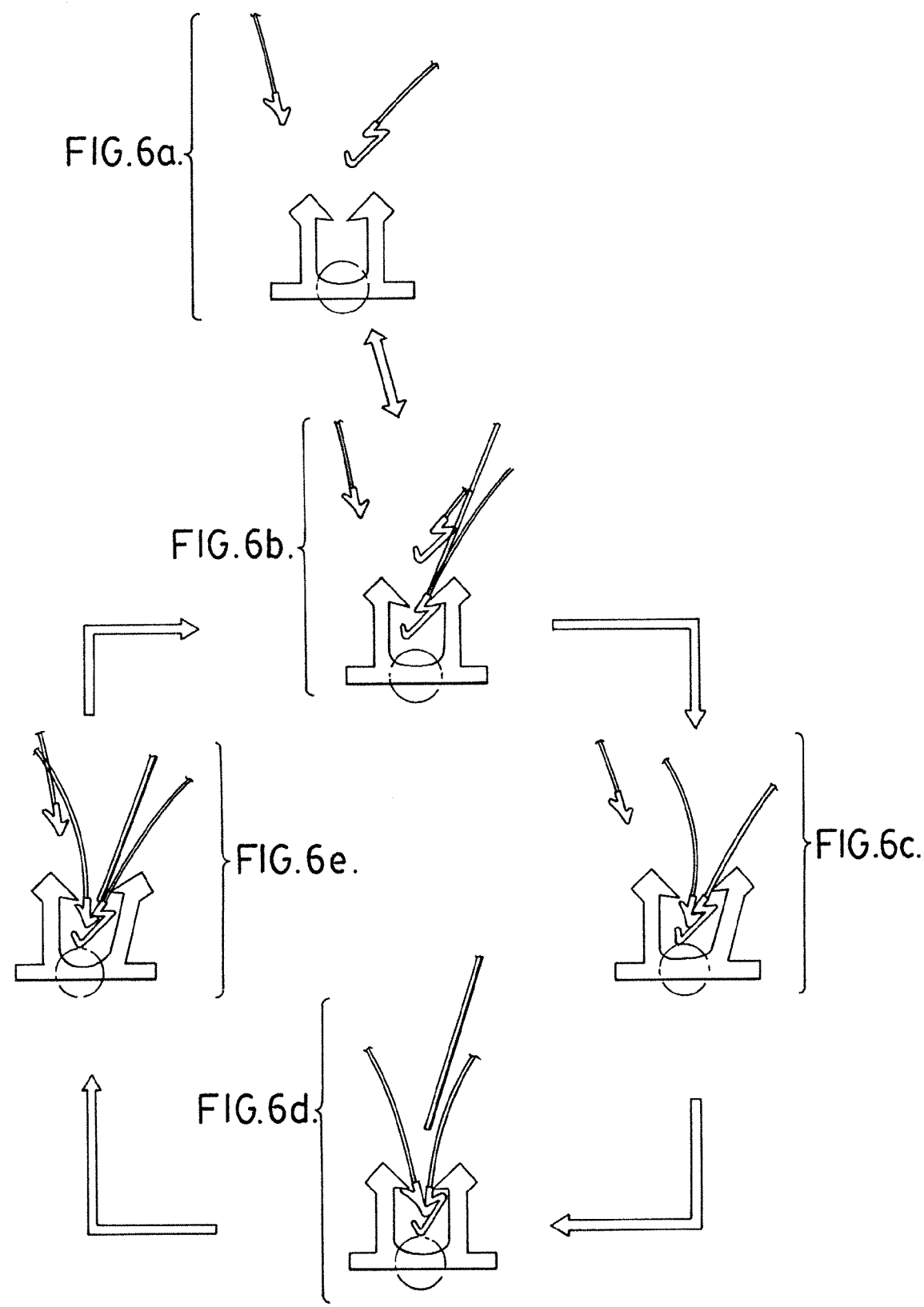

COVER ATTACHMENT DEVICE

FIELD OF THE INVENTION

In one of its aspects, the present invention relates to an attachment system for attachment of a number of elements, preferably a number of cover elements, to a resilient body. In another of its aspects, the present invention relates to a resilient device, preferably a foam device in a vehicular seat, to which is secured a number of elements using the present attachment system, preferably for attachment of a trim cover to the foam device.

DESCRIPTION OF THE PRIOR ART

Attachment of a trim cover to a resilient device is generally known.

In most cases, the resilient device is a foam device, although, in some cases, a fibrous matrix such as rubberized horsehair and the like is still being employed. Typically, it is desired to secure a trim cover to a resilient device to produce a vehicular seat or a component of a vehicular seat.

There are three general categories of approaches in attachment of a trim cover to a resilient device: adhesive, foam-in-place and mechanical. The present invention relates to an improvement falling in the latter category and thus, prior art in this category will be discussed.

In the mechanical approach for attachment of a trim cover to a resilient device, there are (at least) four sub-categories. For ease of description, reference will be made to a foam device.

First, it is known in art to employ so-called "hog-rings" to secure a trim cover to a resilient device. In this approach, a metal wire is molded into the so-called A-surface of the foam device. The metal wire is exposed at selected spots, typically in a trench, on the surface of the foam device. A trim cover is provided and has a finished outer surface made of leather, cloth, vinyl or the like. Commonly attached to the underside of the trim cover is a non-woven material, a felt material and the like. A hard plastic (or other) bead is attached to the non-woven material. Of course other methods are attaching the hard plastic bead to the trim cover are used in the art. The trim cover is attached to the foam device by aligning the metal wire in the foam device with the hard plastic bead in the trim cover and thereafter engaging the two with a metal ring. Typically, the metal ring is deployed from a so-called hog-ring gun. This approach has been used for many years to secure a trim cover to a foam device. This approach suffers from a number drawbacks. For example, a significant capital cost is required to acquire the hog-ring gun and a significant associated labour cost is required to ensure that trim covers can be attached to foam devices at a rate commensurate with the rate at which the foam device is being produced. Further, since deployment of the first hog-ring immovably secures the trim cover to foam device, there is no play or give. The result of this is that perfect placement of trim cover over the foam device must be achieved prior to deployment of the first hog ring to avoid significant loss of efficiency. Still further, this approach is difficult to use reliably when producing a vehicular seat product which incorporates one or more of a seat heater and an occupant detection system. Still further, the use of metal in the foam device creates additional cost in recycling the finished product after complete of its life cycle. A modification of this approach is to replace the metal wire typically molded into the A-surface of the foam device with a mounting device made of foam—see, for example, Canadian patent application 2,165,930 [Grund et al.], published on Jun. 24, 1996 and DE 44 46 450 C1 [Johnson Controls GmbH & Co.], granted Apr. 4, 1996. Another modification of this approach is to utilize a mechanical clip to connect the trim cover to the metal wire molded into the A-surface of the foam device—see, for example DE 195 30 379 C2 [Johnson Controls GmbH & Co.], published Dec. 19, 1996.

Second, it is known to utilize a plurality of independent or single mechanical clips to secure the trim cover to the foam device. In this approach, a series of mechanical clips is molded in the A-surface of the foam device. Each mechanical clip typically comprises a base which is molded into the foam and a receptacle or clip portion which emerges from the foam at selected locations on the A-surface of the foam device. See, for example, one or more of the following prior art references:

DE 299 17 372 U1 [Johnson Controls GmBH & Co.], published Feb. 24, 2000; and

DE 298 21 697 U1 [Bertrand Faure Sitztechnik GmbH & Co.], published Mar. 25, 1999.

For a typical vehicular seat component (e.g., a seat bottom or a seat back), it is common to require 12-30 of these clips to be molded into the foam device. This approach suffers from a number of drawbacks. For example, it is very difficult to achieve optimal alignment of the individual clips using this approach. This can result in production of an unsightly product. Further, this approach requires significant time to correctly dispose the individual clips in the mold. This results in one or both of low efficiency and increased labour.

Third, it is known to use so-called Velcro™-type fasteners to attach a trim cover to a foam device. These fasteners are also known in the art as touch fasteners or "hook and loop" fasteners. While this approach is reliable, it does suffer from a number of drawbacks. For example, this type of fastener is generally regarded as one of the most expensive approaches to utilize to secure a trim cover to a foam device. Further, this approach is not well suited to fastening around a curve portion of the foam device without incurring significant wastage. Third, in many applications, the use of this approach necessitates the use of a wide fastener to achieve sufficient pullout strength. The result of this is a relatively wide trench which results in a relatively unsightly product.

Fourth, from U.S. Pat. No. 5,641,552 [Tillner], it is known to utilize an anchoring strip which is molded in the A-surface of the foam device. The anchoring strip is in the form a wide, flat connecting bar made of a molded plastic body (polypropylene is provided as an example) and having a series of C-clips disposed at various spots along its length. The wide, flat connecting bar is described as being flexible perpendicular to its main plane. It is clear that this is the only moment of flexibility of the wide, flat connecting bar. This approach has a number of drawbacks. For example, the anchoring strip is not well suited to being used around corners and, for most cost-efficient applications, is really only applicable in straight lengths. Further, if the final product is a vehicle seat, the use of a wide, flat connecting bar made of plastic deleteriously affects comfort. Still further, demolding a foam part having a wide, flat connecting bar of this an anchoring strip is difficult to achieve reliably without tearing out of a portion of the anchoring bar from the A-surface of the foam part. Still further, it is impractical and, in most cases, not possible, to mold the anchoring strip in to foam without fouling of the C-clips.

A significant improvement to the approach taught by Tillner is described in U.S. patent publication S.N. 2003/0215601 [Pedde et al. (Pedde)], published Nov. 20, 2003 (now abandoned.

Thus, despite the advances made to date, there is still room for improvement. For example, much of the attention of the prior art has been focussed on design of the "half" of the attachment device to be molded into the foam part. Very little focus has been devoted to the other "half" of the attachment—i.e., the "half" of the attachment device which is normally secured to the trim cover or other element to be attached to the resilient foam part. Indeed, the conventional approach is to employ a single trim cover having attached thereto (e.g., by sewing, adhesives and like) "half" of the attachment device which is then hog-ringed to a wire molded in the foam part or "snapped" into the other "half" of the attachment device (i.e., in the case of mechanical clip attachment system) or pressed into the other "half" of the attachment device (i.e. in the case of a touch fastener attachment system).

There is an ongoing need for an attachment system, particularly for attachment of a trim cover to a vehicular foam part, which allows for facile replacement of a portion of the trim cover. Such an attachment system would find immediate use, for example to repair a damaged portion of the trim cover, to replace a worn portion of the trim cover, to provide for interchangeability of a portion of the trim cover owing to a change in individual design preference and the like. Such a system would be highly desirable in vehicular seat applications, for example, to allow for replacement of the portion of the trim cover corresponding to the centre of the seat bottom surface (e.g., excluding bolsters) and/or to the centre of the seat back surface (e.g., excluding bolsters).

SUMMARY OF THE INVENTION

It is an object of the present invention to provide an attachment system, preferably a cover attachment system, which obviates or mitigates at least one of the above-mentioned disadvantages of the prior art.

It is another object of the present invention to provide a novel resilient device to which is secure a plurality of elements, preferably a plurality of cover elements.

It is another object of the present invention to provide a novel foam device incorporating the present attachment system, more preferably the present cover attachment device.

Accordingly, in one of its objects, the present invention provides an attachment system for attaching a plurality of elements to a resilient body, the system comprising a first element having attached thereto a first attachment portion and a second element having attached thereto a second attachment portion, the first attachment portion and the second attachment portion being releasably engageable with the resilient body.

In another of its aspects, the present invention provides a resilient device comprising a resilient body and the present attachment system secured with respect to the resilient body.

In yet another of its aspects, the present invention provides a resilient device comprising a resilient body, a cover attachment device secured to the resilient body and the cover material secured to the attachment device, the cover material comprising a first cover portion having attached thereto a first attachment portion and a second cover portion having attached thereto a second attachment portion, each of the first attachment portion and the second attachment portion being engaged to the cover attachment device.

The present inventors have developed an attachment system, preferably for attachment of a trim cover to a foam element, having a combination one or more of the following advantages:

facile replacement of a portion of the trim cover (or other element), facile repair of a damaged portion of the trim cover (or other element), facile replacement of a worn portion of the trim cover (or other element), provision for interchangeability of a portion of the trim cover (or other surface element)—e.g., owing to a change in individual design preference and the like, replacement of the portion of the trim cover (or other element) corresponding to the centre of the seat bottom surface (e.g., excluding bolsters), replacement of the portion of the trim cover (or other element) corresponding to the centre of the seat back surface (e.g., excluding bolsters) relatively efficient to "load" on the mold, can be made of polymer to facilitate recyclability of the final product, relatively inexpensive, does not require the use of expensive and/or dangerous equipment attach the trim cover (or other element) thereto, can be used to attach a trim cover (or other element) to a foam device around a curved portion, can be easily used to provide straight-line attachment of the trim cover (or other element) to the foam device, can provide some play or give during initial and final attachment of the trim cover (or other element) to the foam device, can be used to secure a trim cover (element) to a foam device with adversely affecting other elements of the foam device (e.g., heating elements, occupant detection systems and the like), can be used facilitate original assembly and subsequent disassembly of the foam device for maintenance or any other purpose, can be deployed in relatively narrow trenches without compromising pull-out strength, and in the case of vehicular applications, allows for replacement of a portion of the trim cover (or other element) by vehicle owner without the need in every case for intervention by vehicle manufacturer and/or service centre.

The present attachment system is particularly well suited to secure a number of elements, preferably a number of cover elements which collectively form a trim cover, to a resilient device such as a foam element with the finished product being utilized as a component of a vehicular seat. While use of the present attachment system to secure a cover material to foam (or other resilient) element is highly preferred, those of skill in the art will readily appreciate the present attachment device may be used in a multitude of other applications. For example, it is possible to utilize the present attachment system to attach components other than a trim cover to a resilient body. Such other components may include heating elements, occupant detection systems, load sensors, conduits for air passageways (e.g., for use in a climate control vehicular seat), auxiliary resilient elements (e.g., multiple hardness foam elements) and like. Further, when the present attachment device is used in a vehicular seat application, it may be used to attach another to any surface of the resilient body (i.e., A-surface, B-surface, etc.). Thus, while the following description of the preferred embodiments of the present attachment system refers to a trim cover attachment system (a highly preferred application of the invention), the scope of the invention is not to be construed as limited to the use of the present attachment system solely in trim cover attachment applications.

As will be developed hereinbelow, a highly preferred embodiment of the present attachment system comprises a first attachment portion and a second attachment portion which are reversible engageable with respect to each other. Preferably, one or both of the first attachment portion and the second attachment portion are elongate (e.g., they may be extruded from a plastic material). In a preferred embodiment, once the first attachment portion and the second attachment portion are engaged, they may form a profile which is engaged with the female portion of a mechanical clip secured to a resilient body (e.g., a mechanical clip molded into a foam body). The mechanical clip may be one such as taught by Pedde referred to hereinabove or a series of independent mechanical clips.

BRIEF DESCRIPTION OF THE DRAWINGS

Embodiments of the present invention will be described with reference to the accompanying drawings in which like reference numerals denote like elements and in which:

FIGS. 6a-6e illustrate, in a sequential manner, insertion and removal of a portion of the attachment system illustrated in FIGS. 1 and 2 from the female attachment portion.

DETAILED DESCRIPTION OF THE PREFERRED EMBODIMENTS

Figure 1:
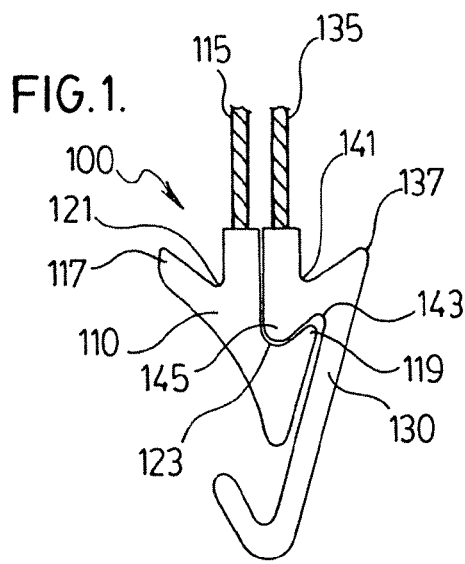
FIG. 1 illustrates a cross-section of an embodiment of the present attachment system.

With reference to FIG. 1, there is illustrated an attachment system 100. Attachment system 100 comprises a first attachment portion 110 and a second attachment portion 130. First attachment portion 110 has connected thereto a cover stock material 115. First attachment portion 110 further comprises a first outward projection 117 and a second outward projection 119. First attachment portion 110 further comprises a first channel 121 and a second channel 123. The first cover portion is attached to the first attachment portion by a first connection material, wherein the first connection material comprises a flexible material.

Second attachment portion 130 has connected thereto a cover stock material 135. Second attachment portion 130 further comprises a first outward projection 137, a first channel 141, a second channel 143 and an inward projection 145. The second cover portion is attached to the first attachment portion by a second connection material, wherein the second connection material comprises a flexible material.

As shown in FIG. 1, first attachment portion 110 and second attachment portion 130 are engaged with respect to one another. This is achieved by the substantially complementary fit between second channel 123 of first attachment portion 110 and inward projection 145 of second attachment portion 130 in combination with the complementary fit between second outward projection 119 of first attachment portion 110 and second channel 143 of second attachment portion 130.

Cover stock material 115 and 135 may be the same and different. As is known in the art, such cover stock material may be made of leather, cloth, vinyl and the like. In a preferred embodiment, cover stock material 115 and cover stock material 135 represent independent portions of a trim cover for a resilience element such as a vehicular seat.

Figure 2:
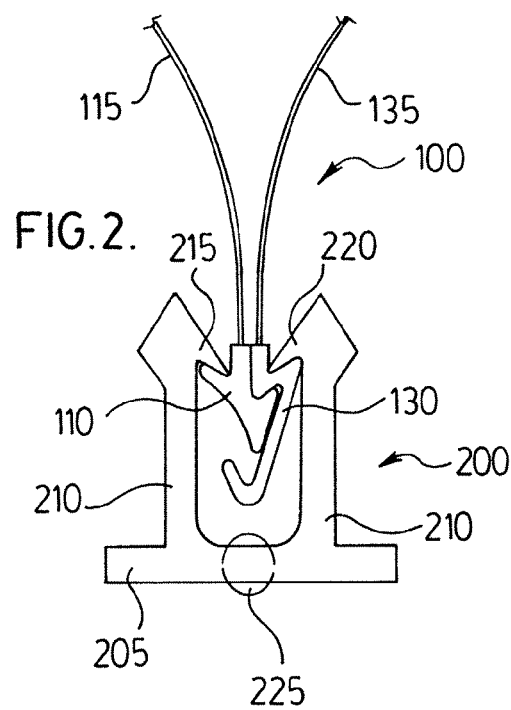
FIG. 2 illustrates engagement of the attachment system in FIG. 1 with female attachment portion.

With reference to FIG. 2, attachment portion 100 is shown in engagement with female attachment device 200 which is similar in design and function to the attachment device illustrated in Pedde referred to hereinabove, particularly the attachment device shown in FIG. 10 thereof.

Thus, female attachment portion 200 comprises a base 205 and a pair of generally upstanding walls 210. As will be described hereinbelow, walls 210 are reversibly removable with respect to one another—e.g., they may be biased toward or away from each other. In the distal region of each wall 210, there is provided a pair of hooks 215, 220.

A number of female attachment portions 200 are interconnected by a flexible portion 225. Flexible portion 225 may be omitted with the result that a plurality of independent female attachment portions 200 (e.g., mechanical clips) would be used.

As illustrated in FIG. 2, attachment system 100 is engaged with respect female attachment portion 200. This is achieved by the combination of: (i) engagement of first attachment portion 110 to second attachment portion 130; (ii) engagement of first outward projection 117 of first attachment portion 110 to hook 215 of wall 205; and (iii) engagement of first outward projection 137 of second attachment portion 130 to hook 220 of wall 210.

Figure 3:
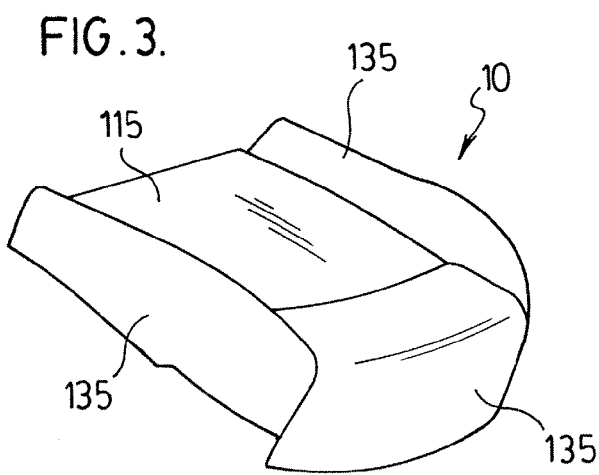
FIG. 3 illustrates a perspective view of a vehicular seat.
Figure 4:
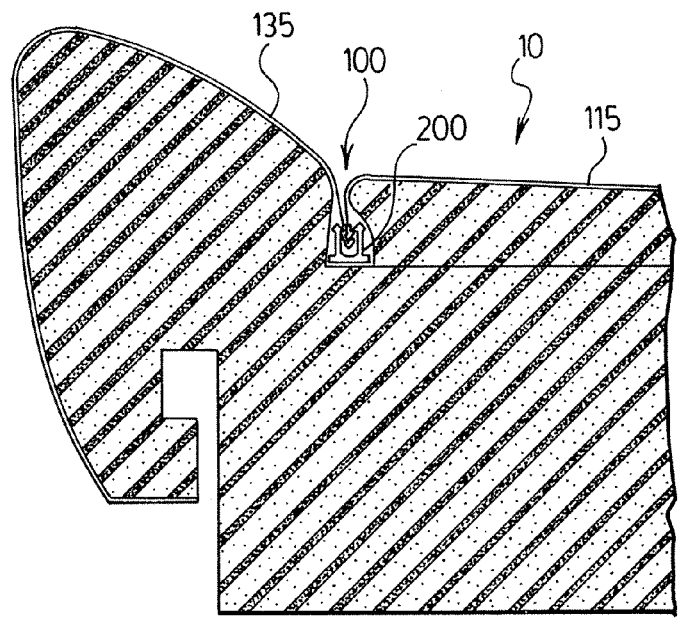
FIG. 4 illustrates an enlarged cross-section of the vehicular seat illustrated in FIG. 3.

With reference to FIGS. 3 and 4, there is illustrated a vehicular seat 10. Vehicular seat 10 has molded therein female attachment portion 200. This may be achieved, for example, in a manner described in Pedde referred to hereinabove. As shown in FIG. 4, attachment system 100 is engaged with respect to female attachment portion 200 in the manner described above with reference to FIG. 2 (in essence, the detail described with respect to FIGS. 1 and 2 may be incorporated in this discussion of FIGS. 3 and 4). In the embodiment illustrated in FIGS. 3 and 4, first cover stock material 115 corresponds to a trim cover portion used to cover a central portion of vehicular seat 10 whereas second cover stock material 135 corresponds to a portion of the trim cover used to cover the peripheral sections of vehicular seat 10—see, in particular, FIG. 3.

As described hereinabove, one of the advantages of the present attachment system is that it allows for removal of a portion of the trim cover from a vehicular seat (e.g., due to damage to the portion to be removed, a desire to change the cosmetic features of the portion to be removed and the like). This may be done relatively quickly and without the need for specialized tools and will now be described with reference to FIGS. 5a-5c.

Figures 5A, 5B, 5C:
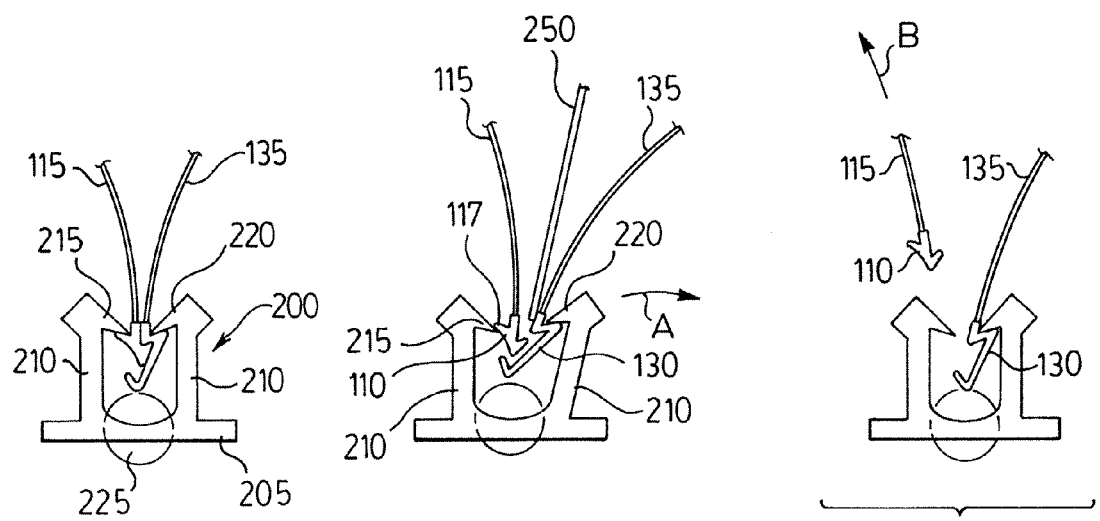
FIGS. 5a-5c illustrate, in a sequential manner, removal of a portion of the attachment system shown in FIGS. 1 and 2 from the female attachment portion.

FIG. 5a is substantively similar to FIG. 2—the attachment system is shown engaged to the female attachment portion.

With reference to FIG. 5b, when it is desired to remove first attachment portion 110 from female attachment portion 200, a simple tool 250 (e.g., a screwdriver or the like) is interposed between first attachment portion 110 and second attachment portion 130. Tool 250 is used to bias wall 210 containing hook 220 away from wall 210 containing hook 215 in the direction of arrow A. This action allows outward projection 117 of first attachment portion 110 to clear hook 215 of wall 210.

With reference to FIG. 5c, first attachment portion 110 may then be completely removed from the attachment system in the direction of arrow B.

When it is desired to install a replacement for first attachment portion 110 (e.g., with new cover stock 115 attached thereto), the foregoing steps may be repeated in reverse order (the use of tool 250 is optional when reinstalling first attachment portion 110).

With reference to FIGS. 6a-6c, there is shown, in a sequential manner, removable attachment of the attachment system to the female attachment portion. For clarity, reference numerals have been omitted but would be the same as described above with reference to FIGS. 1-5.

Thus, in FIG. 6a, there is shown the attachment system disassembled with respect to the female attachment portion.

FIG. 6b illustrates installation of second attachment portion 130 of attachment system 100.

FIG. 6c illustrates installation of first attachment portion 110 of attachment system 100. After installation, attachment portion 110 is engaged with respect to second attachment portion 130 and both of these elements are engaged with respect to female attachment portion 200—i.e., the result would be similar to that illustrated in FIG. 2.

FIGS. 6d and 6e illustrate removal of first attachment portion 110 in the manner described above with respect to FIGS. 5a-5c.

Thus, FIGS. 6a-6e illustrate the usefulness of the present attachment system in that one or both of the first attachment portion and the second attachment portion may be removed from the female attachment portion and the process may be repeated cyclically.

While this invention has been described with reference to illustrative embodiments, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. An attachment system for attaching a plurality of elements to a resilient body, the system comprising:
    a first element having attached thereto a first attachment portion, the first attachment portion having a top and a bottom which define a vertical direction, the first attachment portion top being coupled to the first element; and
    a second element having attached thereto a second attachment portion, the first attachment portion and the second attachment portion being (i) separate, and (ii) releasably engageable with respect to each other in said vertical direction, said first attachment portion being releasably engageable with the resilient body in said vertical direction while said second attachment portion remains engaged with the resilient body.

2. The attachment system defined in claim 1, wherein the first attachment portion and the second attachment portion are configured to be releasable with respect to one another when the first attachment portion is released from the resilient body.

3. The attachment system defined in claim 1, wherein the first attachment portion comprises a first proximal portion for engagement with the resilient body and a first distal portion for engagement with the second attachment portion.

4. The attachment system defined in claim 1, wherein the second attachment portion comprises a second proximally projecting portion for engagement with the resilient body and a second distally projecting portion for engagement with the first attachment portion.

5. The attachment system defined in claim 1, wherein the first attachment portion comprises a first proximally projecting portion for engagement with the resilient body and a first distally projecting portion for engagement with the second attachment portion; and wherein the second attachment portion comprises a second proximally projecting portion for engagement with the resilient body and a second distally projecting portion for engagement with the first attachment portion.

6. The attachment system defined in claim 5, wherein the first distally projecting portion and the second distally projecting portion have a substantially complementary shape.

7. The attachment system defined in claim 5, wherein the first distally projecting portion comprises a female portion and the second distally projecting portion comprises a male portion for engagement with the female portion.

8. The attachment system defined in claim 1, wherein the first attachment portion and the second attachment portion are releasably engageable with respect to one another to define, in cross-section, a substantially arrowhead shape.

9. The attachment system defined in claim 1, wherein the first attachment portion comprises a polymer material.

10. The attachment system defined in claim 1, wherein the second attachment portion comprises a polymer material.

11. The attachment system defined in claim 1, wherein the first attachment portion and the second attachment portion each comprise a polymer material.

12. The attachment system defined in claim 1, wherein at least one of the first element and the second element comprises a cover portion the for the resilient body.

13. The attachment system defined in claim 1, wherein the first element comprises a first cover portion and the second element comprises a second cover portion.

14. The attachment system defined in claim 13, wherein the first cover portion comprises a material selected from the group consisting of leather, cloth, vinyl, and combinations thereof.

15. The attachment system defined in claim 13, wherein the second cover portion comprises a material selected from the group consisting of leather, cloth, vinyl and combinations thereof.

16. The attachment system defined in claim 13, wherein the first cover portion and the second cover portion are comprised of the same material.

17. The attachment system defined in claim 13, wherein the first cover portion and the second cover portion are comprised of a different material.

18. The attachment system defined in claim 13, wherein the first cover portion is attached to the first attachment portion by a first connection material.

19. The attachment system defined in claim 18, wherein the first connection material comprises a flexible material.

20. The attachment system defined in claim 19, wherein the flexible material comprises a woven material.

21. The attachment system defined in claim 20, wherein the woven material comprises a fibrous material.

22. The attachment system defined in claim 20, wherein the woven material comprises a felt material.

23. The attachment system defined in claim 19, wherein the flexible material comprises a non-woven material.

24. The attachment system defined in claim 23, wherein non-woven material comprises a polymer material.

25. The attachment system defined in claim 13, wherein the second cover portion is attached to the second attachment portion by a second connection material.

26. The attachment system defined in claim 25, wherein the second connection material comprises a flexible material.

27. A resilient device comprising a resilient body and the attachment system defined in claim 1, secured with respect to the resilient body.

28. The resilient device defined in claim 27, wherein the resilient body is selected from the group comprising a foam, a fibrous matrix and mixtures thereof.

29. The resilient device defined in claim 27, wherein the resilient body comprises an isocyanate-based foam.

30. The resilient device defined in claim 27, wherein the resilient body comprises a polyurethane foam.

31. The resilient device defined in claim 27, wherein the resilient body comprises an attachment device for receiving the attachment system.

32. The resilient device defined in claim 31, wherein at least a portion of the attachment device is molded into a surface of the resilient body.

33. The resilient device defined in claim 27, wherein the first attachment portion is releasably engaged to the second attachment portion.

34. The resilient device defined in claim 27, wherein the first attachment portion and the second attachment portion are each engaged to the attachment device.

35. The resilient device defined in claim 27, wherein at least one of the first attachment portion and the second attachment portion are releasably engaged to the attachment device.

36. The resilient device defined in claim 27, wherein the attachment device comprises a plurality of attachment portions.

37. The resilient device defined in claim 36, wherein the plurality of attachment portions are interconnected to one another by at least one connecting portion.

38. The resilient device defined in claim 37, wherein the connecting portion is flexible in at least two independent planes.

39. The resilient device defined in claim 36, wherein the plurality of attachment portions are independent of one another.

40. The resilient device defined in claim 36, wherein each cover attachment portion comprises a female attachment portion attached to a base portion.

41. The resilient device defined in claim 40, wherein the base portion has a larger surface area than a surface area of the female attachment portion attached thereto.

42. The resilient device defined in claim 40, wherein the female attachment portion comprises a clip portion.

43. The resilient device defined in claim 42, wherein the clip portion comprises a substantially U-shaped cross-section.

44. The resilient device defined in claim 43, wherein the substantially U-shaped cross-section comprises a pair of generally upstanding walls defining a locking region therebetween for receiving the first attachment portion and the second attachment portion of the cover material.

45. The resilient device defined in claim 44, wherein a distal portion of each of the upstanding walls comprises a locking portion for engaging the first attachment portion and the second attachment portion of the cover material.

46. A vehicular seat element comprising the resilient device defined in claim 27.

47. The attachment system defined in claim 1, wherein the first attachment portion and the second attachment portion are configured such that a release tool manipulated between the attachment portions will cause the release of said first attachment portion with respect to both the second attachment portion and the resilient body.

48. The resilient device defined in claim 1, wherein the first attachment portion and the second attachment portion are configured such that a release tool manipulated between the attachment portions will cause the release of said first attachment portion with respect to both the second attachment portion and the attachment device.

49. A resilient device comprising:
a resilient body;
a cover attachment device secured to the resilient body; and
a cover material secured to the attachment device, the cover material comprising (i) a first cover portion having attached thereto a first attachment portion, and (ii) a second cover portion having attached thereto a second attachment portion, each of the first attachment portion and the second attachment portion being engaged to the cover attachment device, the first attachment portion being releasable with respect to both the attachment device and the second attachment portion with substantially the same motion.

50. The resilient device defined in claim 49, wherein the first attachment portion and the second attachment portion are releasably engageable with respect to one another in a vertical direction of the first attachment portion.

51. The resilient device defined in claim 49, wherein the first attachment portion comprises a first proximally projecting portion for engagement with the resilient body and a first distally projecting portion for engagement with the second attachment portion.

52. The resilient device defined in claim 49, wherein the second attachment portion comprises a second proximally projecting portion for engagement with the resilient body and a second distally projecting portion for engagement with the first attachment portion.

53. The resilient device defined in claim 49, wherein the first attachment portion comprises a first proximally projecting portion for engagement with the resilient body and a first distally projecting portion for engagement with the second attachment portion; and wherein the second attachment portion comprises a second proximally projecting portion for engagement with the resilient body and a second distally projecting portion for engagement with the first attachment portion.

54. The resilient device defined in claim 53, wherein the first distally projecting portion and the second distally projecting portion have a substantially complementary shape.

55. The resilient device defined in claim 53, wherein the first distally projecting portion comprises a female portion and the second distally projecting portion comprises a male portion for engagement with the female portion.

56. The resilient device defined in claim 49, wherein the first attachment portion and the second attachment portion are releasably engageable to define, in cross-section, a substantially arrowhead shape.

57. The resilient device defined in claim 49, wherein the first attachment portion and the second attachment portion each are constructed from a polymer material.

58. The resilient device defined in claim 49, wherein the first cover portion and the second cover portion each comprises a material selected from the group consisting of leather, cloth, vinyl, and combinations thereof.

59. The resilient device defined in claim 49, wherein the first cover portion is attached to the first attachment portion by a first connection material and the second cover portion is attached to the second attachment portion by a second connection material.

60. The resilient device defined in claim 59, wherein the first connection material and the second connection material each comprises a flexible material.

61. The resilient device defined in claim 60, wherein the flexible material comprises a woven material.

62. The resilient device defined in claim 61, wherein the woven material comprises a fibrous material.

63. The resilient device defined in claim 61, wherein the woven material comprises a felt material.

64. The resilient device defined in claim 60, wherein the flexible material comprises a non-woven material.

65. The resilient device defined in claim 64, wherein non-woven material comprises a polymer material.

66. The resilient device defined in claim 49, wherein the resilient body is selected from the group consisting of a foam, a fibrous matrix, and mixtures thereof.

67. The resilient device defined in claim 66, wherein the resilient body comprises an isocyanate-based foam.

68. The resilient device defined in claim 66, wherein the resilient body comprises a polyurethane foam.

69. The resilient device defined in claim 49, wherein at least a portion of the cover attachment device is molded into a surface of the resilient body.

70. The resilient device defined in claim 49, wherein the first attachment portion is releasably engaged to the second attachment portion.

71. The resilient device defined in claim 49, wherein the first attachment portion and the second attachment portion are each engaged to the attachment device.

72. The resilient device defined in claim 49, wherein at least one of the first attachment portion and the second attachment portion are releasably engaged to the attachment device.

73. The resilient device defined in claim 49, wherein the cover attachment device comprises a plurality of attachment portions.

74. The resilient device defined in claim 73, wherein the plurality of attachment portions are interconnected to one another by at least one connecting portion.

75. The resilient device defined in claim 74, wherein the connecting portion is flexible in at least two independent planes.

76. The resilient device defined in claim 73, wherein the plurality of attachment portions are independent of one another.

77. The resilient device defined in claim 73, wherein each cover attachment portion comprises a female attachment portion attached to a base portion.

78. The resilient device defined in claim 77, wherein the base portion has a larger surface area than a surface area of the female attachment portion attached thereto.

79. The resilient device defined in claim 77, wherein the female attachment portion comprises a clip portion.

80. The resilient device defined in claim 79, wherein the clip portion comprises a substantially U-shaped cross-section.

81. The resilient device defined in claim 80, wherein U-shaped cross-section comprises a pair of generally upstanding walls defining a locking region therebetween for receiving the first attachment portion and the second attachment portion of the cover material.

82. The resilient device defined in claim 81, wherein a distal portion of each of the upstanding walls comprises a locking portion for engaging the first attachment portion and the second attachment portion of the cover material.

83. A vehicular seat element comprising the resilient device defined in claim 49.

\* \* \* \* \*